(12) United States Patent
Li

(10) Patent No.: US 10,956,976 B2
(45) Date of Patent: Mar. 23, 2021

(54) RECOMMENDING SHARED PRODUCTS

(71) Applicant: Advanced New Technologies Co., Ltd., Grand Cayman (KY)

(72) Inventor: Qianyuan Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/806,919

(22) Filed: Mar. 2, 2020

(65) Prior Publication Data
US 2020/0202430 A1 Jun. 25, 2020

Related U.S. Application Data

(63) Continuation of application No. PCT/CN2018/106914, filed on Sep. 21, 2018.

(30) Foreign Application Priority Data

Nov. 16, 2017 (CN) .......................... 201711135185.7

(51) Int. Cl.
*G06Q 40/00* (2012.01)
*G06Q 40/02* (2012.01)
*G06N 20/00* (2019.01)
*G06Q 30/06* (2012.01)

(52) U.S. Cl.
CPC .......... *G06Q 40/025* (2013.01); *G06N 20/00* (2019.01); *G06Q 30/0631* (2013.01)

(58) Field of Classification Search
CPC ................................................. G06Q 40/025
USPC .......................................................... 705/35
See application file for complete search history.

(56) References Cited

U.S. PATENT DOCUMENTS

| | | | |
|---|---|---|---|
| 7,809,601 B2 | 10/2010 | Shaya et al. | |
| 2012/0166264 A1* | 6/2012 | Shum | G06Q 30/02 705/14.17 |
| 2012/0296701 A1* | 11/2012 | Breiter | G06Q 30/0203 705/7.33 |

(Continued)

FOREIGN PATENT DOCUMENTS

| | | |
|---|---|---|
| CN | 102163310 | 8/2011 |
| CN | 103685475 | 3/2014 |

(Continued)

OTHER PUBLICATIONS

Li Yueyang, Shuai Bin; "Origin and destination forecasting on dockless shared bicycle in a hybrid deep-learning algorithms"; Multimedi Tools and Applications; Dordrecht. vol. 79, Iss. 7-8. Feb. (Year: 2020).*

(Continued)

*Primary Examiner* — Edward Chang
(74) *Attorney, Agent, or Firm* — Fish & Richardson P.C.

(57) ABSTRACT

An electronic device obtains credit information of a user, where the credit information of the user is derived at least in part from a usage history of the user for a shared product. The electronic device inputs the credit information of the user to a recommendation model for calculation, where the recommendation model is a machine learning model. The electronic device derives, based on the recommendation model, a shared product use probability. The electronic device recommends the shared product to the user based on the shared product use probability.

20 Claims, 2 Drawing Sheets

(56) References Cited

U.S. PATENT DOCUMENTS

| | | |
|---|---|---|
| 2014/0279263 A1 | 9/2014 | Liu et al. |
| 2015/0178804 A1 | 6/2015 | Goad et al. |
| 2015/0178811 A1 | 6/2015 | Chen |
| 2016/0300144 A1 | 10/2016 | Santhanam et al. |
| 2016/0328766 A1 | 11/2016 | Krejci |
| 2017/0091844 A1 | 3/2017 | Yarvis et al. |
| 2018/0316635 A1* | 11/2018 | Chiu .................... H04L 67/306 |

FOREIGN PATENT DOCUMENTS

| | | |
|---|---|---|
| CN | 106202186 | 12/2016 |
| CN | 106327240 | 1/2017 |
| CN | 106485562 | 3/2017 |
| CN | 107154006 | 9/2017 |
| CN | 107316234 | 11/2017 |
| CN | 107909439 | 4/2018 |
| TW | M543416 | 6/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.

International Search Report and Written Opinion in PCT Appln. No. PCT/CN2018/106914, dated Dec. 25, 2018, 9 pages (with partial translation).

Nakamoto, "Bitcoin: A Peer-to-Peer Electronic Cash System," www.bitcoin.org, 2005, 9 pages.

International Preliminary Report on Patentability in International Application No. PCT/CN2018/106914, dated May 19, 2020, 10 pages (with partial English translation).

* cited by examiner

RECOMMENDING SHARED PRODUCTS

CROSS-REFERENCE TO RELATED APPLICATIONS

This application is a continuation of PCT Application No. PCT/CN2018/106914, filed on Sep. 21, 2018, which claims priority to Chinese Patent Application No. 201711135185.7, filed on Nov. 16, 2017, and each application is hereby incorporated by reference in its entirety.

TECHNICAL FIELD

The present disclosure relates to the field of computer applications, and in particular, to a shared product recommendation method and apparatus and an electronic device.

BACKGROUND

Sharing economy is an emerging economic model in recent years. Different from a conventional trading economy, the sharing economy is essentially a time-based rental economy. Service providing companies usually launch a large number of shared products in various corners of the market for users to find and rent. For example, currently, in the sharing economy field, a series of products and services such as shared bicycle, shared mobile power bank, shared umbrella, and shared clothing have emerged.

SUMMARY

The present specification provides a shared product recommendation method, where the method includes: obtaining credit information of a user; inputting the credit information to a recommendation model for calculation, where the recommendation model is a machine learning model, and modeling features of the machine learning model include the credit information of the user; and recommending a shared product to the user based on a calculation result of the recommendation model, where a usage history of the user for the shared product is used to evaluate the credit information of the user.

Optionally, the modeling features further include basic information about the shared product, and the basic information about the shared product includes a credit admission condition of the shared product, and the method further includes: inputting the basic information about the shared product to the recommendation model for calculation.

Optionally, the modeling features further include condition of use information of the shared product and user information used to determine whether the user satisfies a condition of use of the shared product.

Optionally, the calculation result of the recommendation model is a use probability of the user for the shared product; and the recommending a shared product to the user based on a calculation result of the recommendation model includes: determining whether the use probability of the user for the shared product calculated by the recommendation model reaches a predetermined threshold, and recommending the shared product to the user if the use probability of the user for the shared product reaches the predetermined threshold.

Optionally, before the recommending the shared product to the user, the method further includes: determining whether the user satisfies a condition of use of the shared product; and recommending the shared product to the user if the user satisfies the condition of use of the shared product.

Optionally, the condition of use includes at least one of the following conditions: a distance between the user and the shared product is less than a predetermined threshold; the user matches a user group predetermined for the shared product; a use environment of the user matches a use environment predetermined for the shared product; or a proportion of a negative usage history in the usage history of the user for the shared product is less than a predetermined threshold.

Optionally, the credit information of the user is a credit score obtained after the user is evaluated based on a credit evaluation model.

The present specification further provides a shared product recommendation apparatus, where the apparatus includes: an acquisition module, configured to obtain credit information of a user; a calculation module, configured to input the credit information to a recommendation model for calculation, where the recommendation model is a machine learning model, and model features of the machine learning model include the credit information of the user; and a recommendation module, configured to recommend a shared product to the user based on a calculation result of the recommendation model, where a usage history of the user for the shared product is used to evaluate the credit information of the user.

Optionally, the model features further include basic information about the shared product, and the basic information about the shared product includes a credit admission condition of the shared product; and the calculation module is further configured to: inputting the basic information about the shared product to the recommendation model for calculation.

Optionally, the model features further include condition of use information of the shared product and user information used to determine whether the user satisfies a condition of use of the shared product.

Optionally, the calculation result of the recommendation model is a use probability of the user for the shared product; and the recommendation module is configured to: determine whether the use probability of the user for the shared product calculated by the recommendation model reaches a predetermined threshold, and recommend the shared product to the user if the use probability of the user for the shared product reaches the predetermined threshold.

Optionally, the recommendation module is further configured to: determine whether the user satisfies a condition of use of the shared product before recommending the shared product to the user; and recommend the shared product to the user if the user satisfies the condition of use of the shared product.

Optionally, the condition of use includes at least one of the following conditions: a distance between the user and the shared product is less than a predetermined threshold; the user matches a user group predetermined for the shared product; a use environment of the user matches a use environment predetermined for the shared product; or a proportion of a negative usage history in the usage history of the user for the shared product is less than a predetermined threshold.

Optionally, the credit information of the user is a credit score obtained after the user is evaluated based on a credit evaluation model.

The present specification further provides an electronic device, including: processor; and memory, configured to store a machine executable instruction, where by reading and executing the machine executable instruction that is stored in the memory and corresponds to control logic of shared product recommendation, the processor is prompted to perform the following steps: obtaining credit information of a user; inputting the credit information to a recommendation model for calculation, where the recommendation model is a machine learning model, and model features of the machine learning model include the credit information of the user; and recommending a shared product to the user based on a calculation result of the recommendation model, where a usage history of the user for the shared product is used to evaluate the credit information of the user.

In the technical solutions provided in the implementations of the present specification, a usage history of a user for a shared product recommended by the recommendation model can be used to evaluate credit information of the user, and the credit information of the user is used as an input to the recommendation model. Therefore, the usage history of the user for the shared product recommended by the recommendation model indirectly affects a next shared product to be recommended by the recommendation model to the user, and thereby a complete closed-loop service can be formed from credit evaluation of the user to shared product recommendation to the user. As such, the recommendation model can recommend a higher-quality shared product service to a user with a better usage history, thereby forming a virtuous cycle.

DESCRIPTION OF IMPLEMENTATIONS

Figure 1:
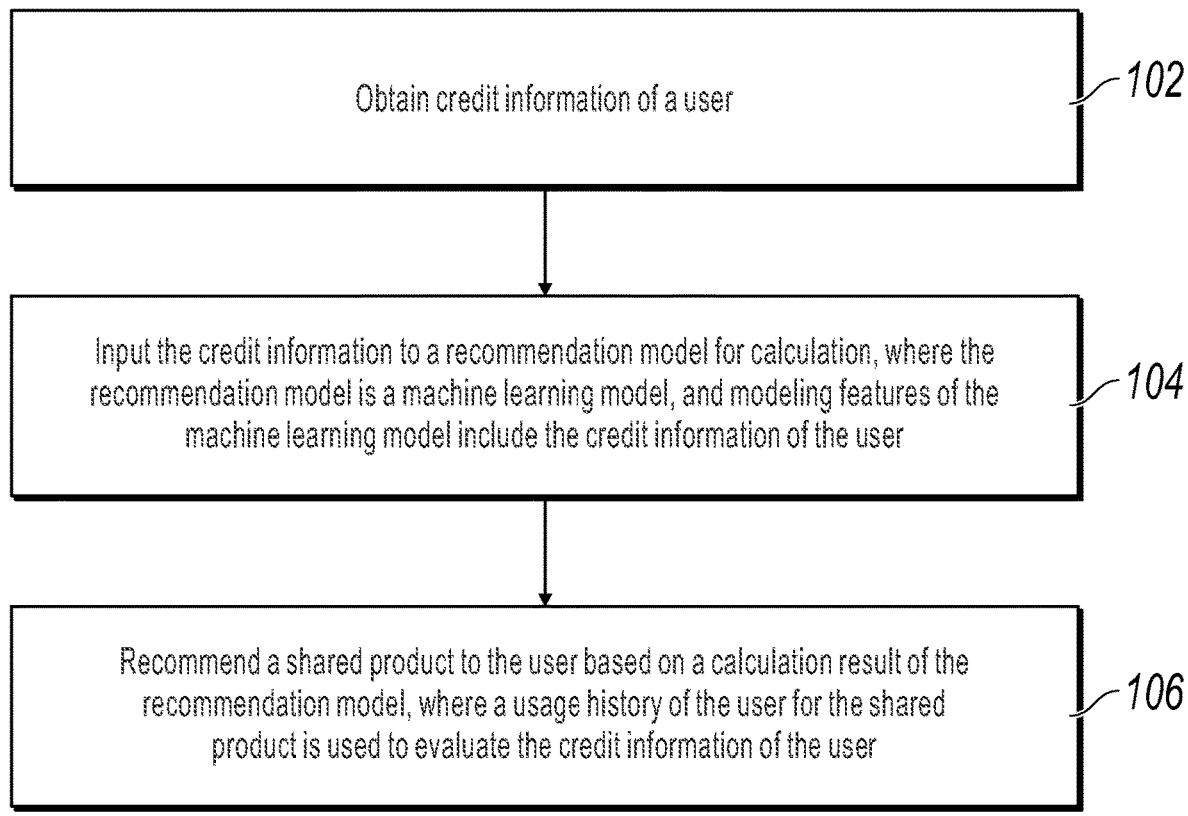
FIG. 1 is a flowchart illustrating a shared product recommendation method, according to an implementation of the present specification.

The present specification is intended to provide a shared product recommendation mode in which a shared product is recommended to a user based on credit information of the user, and credit of the user is evaluated again based on a usage history of the user for the recommended shared product, to form a closed-loop service from credit evaluation of the user to shared product recommendation to the user.

In implementation, a shared product operator can prepare a large number of sample users in advance, participate in machine learning model training by using credit information of these sample users as one of modeling features in several dimensions needed for modeling, to build a recommendation model used to recommend a shared product to a user.

To recommend a shared product to a user by using the recommendation model, credit information of the user can be obtained, prediction samples can be built based on the credit information of the user, the prediction samples are input to the recommendation model for calculation, and then a shared product is recommended to the user based on a calculation result.

For example, the calculation result of the recommendation model can be a use probability of the user for the shared product. If a use probability of the user for a certain shared product reaches a predetermined threshold, the shared product can be recommended to the user.

After recommending the shared product to the user, the shared product operator can further evaluate the credit information of the user again based on a usage history of the user for the recommended shared product. Credit information obtained after evaluation is performed again is used as an input to the recommendation model when a next shared product is to be recommended to the user.

In the previous technical solutions, a usage history of a user for a shared product recommended by the recommendation model can be used to evaluate credit information of the user, and the credit information of the user is used as an input to the recommendation model. Therefore, the usage history of the user for the shared product recommended by the recommendation model indirectly affects a next shared product to be recommended by the recommendation model to the user, and thereby a complete closed-loop service can be formed from credit evaluation of the user to shared product recommendation to the user. As such, the recommendation model can recommend a higher-quality shared product service to a user with a better usage history, thereby forming a virtuous cycle.

For example, for a user, a usage history for a recommended shared product directly affects next recommendation of the recommendation model to the user, and therefore if the user wants the recommendation model to continuously recommend a high-quality shared product to the user, the user needs to maintain a good use habit. It can be seen that in this method, a behavior habit of using a shared product by a user can be indirectly restricted.

For the shared product operator, a shared product is recommended to a user based on credit information of the user, so that shared products can be prioritized and recommended to some users with high credit. As such, the probability that the shared products are damaged by some users with a bad use habit can be reduced, and operation costs of launching the shared products by the operator can be improved. For example, in this recommendation mode in which shared products are recommended to some users with high credit based on credit information, the operator can no longer need to launch massive shared products offline, but launch only shared products that can satisfy the use demands of these users with high credit.

The following describes the present specification by using specific implementations and with reference to specific application scenarios.

FIG. 1 illustrates a shared product recommendation method, according to an implementation of the present specification. The method includes the following steps.

Step 102: Obtain credit information of a user.

Step 104: Input the credit information to a recommendation model for calculation, where the recommendation model is a machine learning model, and model features of the machine learning model include credit information of a user.

Step 106: Recommend a shared product to the user based on a calculation result of the recommendation model, where a usage history of the user for the shared product is used to evaluate the credit information of the user.

The shared product can include an offline product launched by an operator for the user to find and rent. For example, in the sharing economy field, the shared product can be an offline product such as a shared bicycle, a shared mobile power bank, a shared umbrella, or shared clothing that has emerged.

The credit information can include any form of data that can represent a credit limit of the user. For example, the credit information can be a credit score obtained after credit evaluation is performed on the user based on a credit evaluation model built through machine learning. Certainly, other than the credit score, the credit information can be other forms of credit score that can indirectly represent the credit limit of the user, for example, a risk score obtained after risk evaluation is performed on the user by using a built risk assessment model. Implementations are not limited in the present specification.

In the present specification, the shared product operator can participate in machine learning model training by using the credit information of the user as a modeling feature, recommend the shared product to the user based on the trained recommendation model, then evaluate the credit information of the user again based on the usage history of the user for the recommended shared product, and use credit information obtained after evaluation is performed again as an input to the recommendation model for next recommendation to the user, to form a complete closed-loop service from credit evaluation of the user to shared product recommendation to the user.

In an initial state, the shared product operator can prepare a large number of sample users, obtain credit information of these sample users, and then participate in machine model training by using the obtained credit information as one of modeling features in several dimensions needed for modeling, to build the recommendation model used to recommend a shared product to a user.

In a shown implementation, the modeling features in several dimensions needed for training the recommendation model can include basic information about the shared product in addition to the credit information of the user.

The credit information of the user can be a credit score that can represent a credit risk of the user and is obtained after credit evaluation is performed on the user based on a predetermined credit evaluation model. The credit evaluation model can also be a machine learning model trained based on modeling features in several dimensions related to a credit risk of a user.

For example, in an implementation, the shared product operator can build the modeling features in several dimensions related to the credit risk of the user (for example, a usage history of the user for the shared product) based on a large amount of user data collected in a system to train the credit evaluation model, and then perform credit evaluation on the user by using the trained credit evaluation model to obtain a credit score. The modeling features and the specific training process needed for training the credit evaluation model are not described in detail in the present specification. A person skilled in the art can refer to description in related technologies when implementing the technical solutions described in the present specification.

Alternatively, in another implementation, the shared product operator does not train the credit evaluation model, but directly accesses a third-party credit evaluation institution, and when needing to obtain a credit score of a user, the operator can query the credit score of the user by interconnecting with the third-party credit evaluation institution. For example, the credit score can be a "ZHIMA credit score" obtained after ALIPAY performs credit evaluation on the user. In this case, the shared product operator can directly interconnect with a system platform of ALIPAY, and can query the system platform of ALIPAY when needing to obtain the credit score of the user.

The basic information about the shared product can include some basic attribute information of the shared product to be recommended, for example, a specification and a geographic location of the shared product, a user group that the shared product is oriented to, etc.

In the present specification, the recommendation model recommends the shared product to the user by using the credit information of the user as an input. Therefore, the basic information about the shared product can further include credit admission condition of the shared product.

The credit admission condition is used to evaluate whether the user satisfies the credit admission conditions specified for the shared product. For example, the credit information of the user is a credit score. In practice, the credit admission conditions can be a credit score threshold, and the user is qualified to use the shared product only when the credit score of the user reaches the credit score threshold.

In this case, the shared product operator can build training samples based on credit scores of the sample users and the credit admission condition of the shared product to be recommended to generate a training sample set, and then train a predetermined machine learning model based on the built training sample set, to build the recommendation model.

For example, the credit admission condition is a credit score threshold value. In this case, the credit score of each sample user and the credit score threshold value corresponding to the shared product to be recommended that are used as feature fields can be combined to generate vectors, and then the generated vectors are used as training samples to generate a target matrix as the training sample set.

The machine learning model can be a supervised machine learning model (for example, a logistic regression model) or an unsupervised machine learning model (for example, an unsupervised clustering model).

The supervised machine learning model is used as an example. In implementation, each training sample can be labeled based on whether a sample user is a potential user of the shared product. For example, a training sample of a potential user of the shared product is used as a positive sample and is labeled with 1, and a training sample of a non-potential user of the shared product is used as a negative sample and is labeled with 0. Alternatively, all samples other than training samples of potential users of the shared product used as negative samples and are labeled with 0 by default. After all the training samples are labeled, the machine learning model can be trained by using a supervised learning method, to build the recommendation model.

The unsupervised machine learning model is used as another example. In implementation, an unsupervised clustering operation can be directly performed on the training sample set by using an unsupervised learning method until an algorithm converges, and the training samples in the training sample set are clustered into potential users and non-potential users of the shared product, to build the recommendation model.

When training of the recommendation model is completed and the recommendation model is used to recommend a shared product to the user, the credit score of the user can be obtained, and then a prediction sample is built based on the credit score of the user and the credit admission condition of the shared product to be recommended.

For example, the credit admission condition is a credit score threshold. In this case, the credit score of the user and the credit score threshold corresponding to the shared product to be recommended that are used as feature fields can be combined to generate a vector, and then the generated vector is used as a prediction sample.

After the prediction sample is built, the prediction sample can be input to the trained recommendation model for calculation, to obtain a calculation result.

In a shown implementation, the calculation result can be a use probability of the user for the shared product (for example, the probability that the user is a potential user of the shared product).

For example, the recommendation model is a supervised machine learning model, and the training samples are usually labeled as a potential user and a non-potential user of the shared product. In this case, the calculation result finally output by the recommendation model can be the probability that the user to be recommended is a potential user of the shared product and the probability that the user is a non-potential user of the shared product.

For another example, the recommendation model is an unsupervised machine learning model, and the training samples are usually clustered into potential users and non-potential users of the shared product. In this case, the calculation result finally output by the recommendation model can be the probability that the user to be recommended belongs to the cluster of potential users of the shared product and the probability that the user to be recommended belongs to the cluster of non-potential users of the shared product.

In the present specification, the recommendation model can be included in a recommendation system of the shared product operator. The recommendation system can recommend the shared product to the user by invoking a result output by the recommendation model.

In a shown implementation, a predetermined threshold value corresponding to the use probability can be preconfigured in the recommendation system. After the use probability of the user for the shared product is obtained by inputting the prediction sample to the recommendation model for calculation, the recommendation system can determine whether the use probability reaches the predetermined threshold. If the use probability output by the model reaches the predetermined threshold, it indicates that the user is a potential user of the shared product in the prediction sample, and the shared product can be recommended to the user. For example, the basic information about the shared product can be pushed to an end-user device of the user by pushing a message. On the contrary, if the use probability output by the model does not reach the predetermined threshold, it indicates that the user is not a potential user of the shared product in the prediction sample, and the shared product cannot be recommended to the user in this case.

In this method, the shared product can be recommended only to some users with high credit who satisfy the credit admission condition of the shared product. Therefore, the operator can find a potential user in a timely way by using the recommendation model, and control users of the shared product. As such, the operator no longer need to deploy massive shared products offline, and only need to launch a proper quantity of shared products offline. Therefore, resource utilization of the shared product can be increased, and operation costs can be reduced.

In the present specification, to ensure accuracy of the shared product recommended by the model, condition of use information corresponding to the shared product to be recommended can also be preconfigured in the recommendation system that includes the recommendation model.

In this case, if determining that the use probability output by the model reaches the predetermined threshold, the recommendation system can further determine whether the user satisfies a condition of use of the shared product to be recommended before recommending the shared product to the user, and then recommend the shared product to the user if the user satisfies the condition of use of the shared product to be recommended.

The condition of use is not limited in the present specification. In practice, the condition of use can be customized by the shared product operator based on an actual service demand.

For example, in an implementation, the condition of use can include at least one of the following conditions of use: a distance between the user and the shared product is less than a predetermined distance threshold; the user matches a user group predetermined for the shared product, for example, whether the user matches a predetermined age group or a specific user group; a use environment of the user matches a use environment predetermined for the shared product, for example, whether a battery level of a mobile phone of the user matches a use battery level threshold predetermined for a shared mobile power bank, or whether a use environment of the user is a use environment (for example, rainy) predetermined for a shared umbrella; or a proportion of a negative usage history in the usage history of the user for shared product is less than a predetermined proportion threshold.

In the present specification, the conditions of use can be preconfigured in the recommendation system that includes the recommendation model. In practice, information related to these conditions of use can also be used as modeling features to participate in model training. In other words, these conditions of use can also be used as a reference when the recommendation model recommends a shared product to a user.

In this case, in addition to the credit information of the user and the credit admission conditions of the shared product, the modeling features in several dimensions used in training the recommendation model can include the condition of use of the shared product and user information used to determine whether the user satisfies the condition of use of the shared product.

For example, the condition of use of the shared product can be included in the basic information about the shared product as one piece of the basic information about the shared product. The user information used to determine whether the user satisfies the condition of use of the shared product can be introduced into the model as user information of another dimension other than the credit information of the user.

Specific content of the condition of use information of the shared product and the user information used to determine whether the user satisfies the condition of use of the shared product depends on the condition of use specified by the shared product operator for the shared product.

For example, when the condition of use includes "the distance between the user and the shared product is less than the predetermined threshold", the condition of use information of the shared product can include geographic location information of the shared product and the predetermined distance threshold, and the user information can include geographic location information of the user.

When the condition of use includes "the user matches the user group predetermined for the shared product", the condition of use information of the shared product can include basic information (for example, an age group) of the user group predetermined for the shared product, and the user information can include basic information (for example, age information) about the user.

When the condition of use includes "the use environment of the user matches the use environment predetermined for the shared product" and whether the environment of the user is the use environment (for example, the rainy environment) predetermined for the shared umbrella, the condition of use information of the shared product can include a battery level threshold, and the user information can include an actual battery level (which needs to be actively reported by the mobile phone of the user) of the mobile phone of the user and a real-time weather condition in the environment of the user.

When the condition of use includes "the proportion of the negative usage history in the usage history of the user for the shared product is less than the predetermined proportion threshold", the condition of use information of the shared product can include the predetermined proportion threshold, and the user information can include the usage history of the user for the shared product.

In the present specification, when the condition of use information above is also used as modeling features to participate in model training, the shared product operator can build training samples based on the credit score of each of the sample users, the credit admission condition of the shared product to be recommended, the condition of use information of the shared product, and the user information, to generate a training sample set, and then train the predetermined machine learning model to build the recommendation model.

After training of the recommendation model is completed, a prediction sample can be built based on the same method, and the built prediction sample can be input to the recommendation model for calculation.

It is worthwhile to note that in this case, the recommendation model also uses the conditions of use as reference factors when recommending the shared product. Therefore, the recommendation model can select a user inside the model. In this case, the calculation result finally output by the recommendation model can be the use probability, for the shared product, of the user who satisfies the condition of use of the shared product in the prediction sample.

For those selected users who do not satisfy the conditions of use, after prediction samples are input to the model, the model can output an output result indicating a use probability of 0 or a pre-defined output result that can indicate that the shared product cannot be recommended to the users. For example, the model can directly output "false" as the output result, to indicate that the model cannot recommend the shared product to the users, and the recommendation fails.

In the present specification, after the recommendation system recommends the shared product to the user based on the calculation result of the recommendation model, the user can find and rent the shared product offline based on recommendation information.

It is worthwhile to note that because the recommendation model recommends a shared product to a user based on credit information of the user, users to which the shared product is recommended are actually users with high credit who satisfy the credit admission condition of the shared product. Therefore, the shared product operator can provide differentiated services for those users to which the shared product is recommended and users to which the shared product is not recommended.

For example, during rental and use of the shared products recommended by system, policies such as a deposit waiver and extension of rental time can be provided to those users who are recommended to shared products, and those users who are not recommended to shared products pay higher service costs to rent and use an offline shared product deployed by the operator, for example, deposit is required or rental time is shorter than those users to which the system actively recommends the shared product.

In the present specification, after recommending a shared product to a user, the shared product operator can further collect a usage history of the user for the recommended shared product in a back end, and perform credit evaluation on the user again based on the collected usage history.

For example, the operator can use the usage history of the user as modeling data to train the credit evaluation model, and perform credit evaluation on the user again by using the trained credit evaluation model. Alternatively, the operator uses the usage history of the user as modeling data, and provides the data for the third-party credit evaluation institution, and the third-party credit evaluation institution performs credit evaluation on the user again based on the data.

After credit evaluation is performed on the user again, an obtained credit score is used as an input when the recommendation model is to recommend a next shared product to the user, to form a complete closed-loop service from credit evaluation of the user to shared product recommendation to the user.

For this type of user, if a negative usage history (for example, the shared product is not returned in time or damaged) occurs for the current recommended shared product, the next recommendation of the recommendation model is directly affected. On the contrary, if there is no negative usage history for the current recommended shared product, a credit improvement of the user is implemented because of accumulation of a positive usage history. Therefore, when recommending a next shared product to the user based on credit information of the user, the recommendation model recommends a higher-quality shared product service to the user.

It can be seen that in this shared product recommendation mode in which a closed-loop service is formed from credit evaluation of a user to shared product recommendation to the user, a use habit of the user for a shared product can be restricted, and the recommendation model can be enabled to provide a higher-quality shared product service for a user with a better usage history, thereby forming a virtuous cycle.

Figure 2:
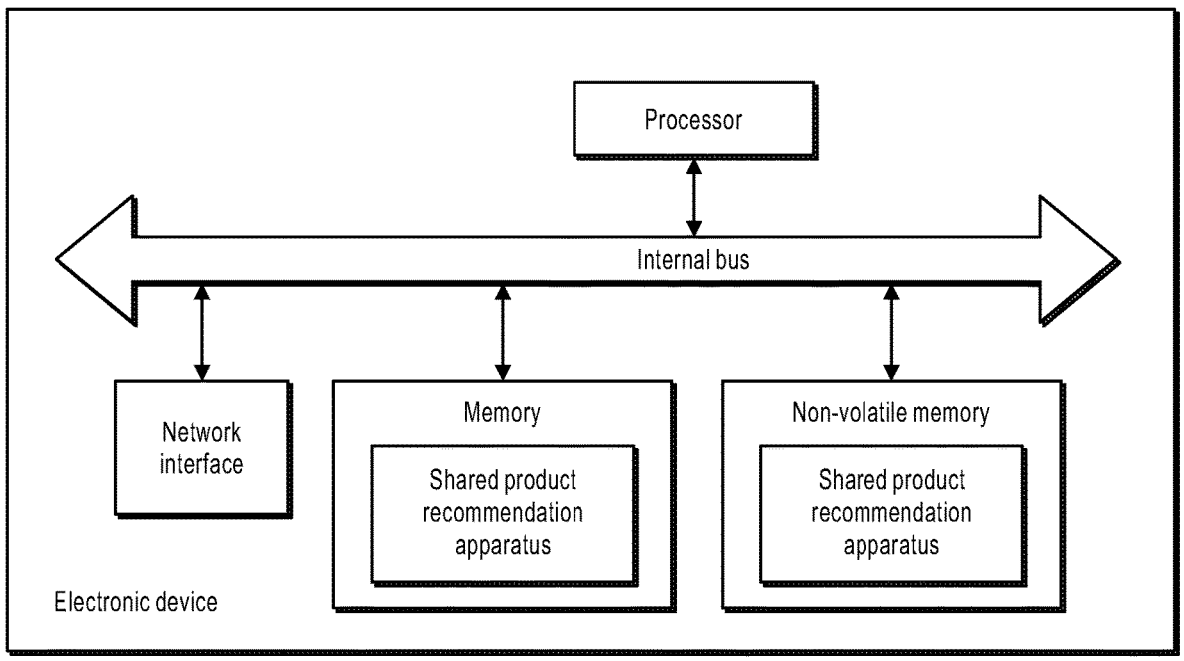
FIG. 2 is a diagram illustrating a hardware structure in an electronic device that includes a shared product recommendation apparatus, according to an implementation of the present specification.

Corresponding to the previously described method implementation, the present specification further provides an implementation of a shared product recommendation apparatus. The implementation of the shared product recommendation apparatus in the present specification can be applied to an electronic device. The apparatus implementation can be implemented by software, or can be implemented by hardware or a combination of software and hardware. Software implementation is used as an example. As a logical apparatus, the apparatus is formed by reading a corresponding computer program instruction from a nonvolatile memory by a processor of the electronic device in which the apparatus is located and running the instruction in a memory. In terms of hardware, FIG. 2 is a diagram illustrating a hardware structure of the electronic device in which the shared product recommendation apparatus is located. In addition to a processor, a memory, a network interface, and a nonvolatile memory shown in FIG. 2, the electronic device in which the apparatus is located in the present implementation usually can include other hardware based on an actual function of the electronic device. Details are omitted here for simplicity.

Figure 3:
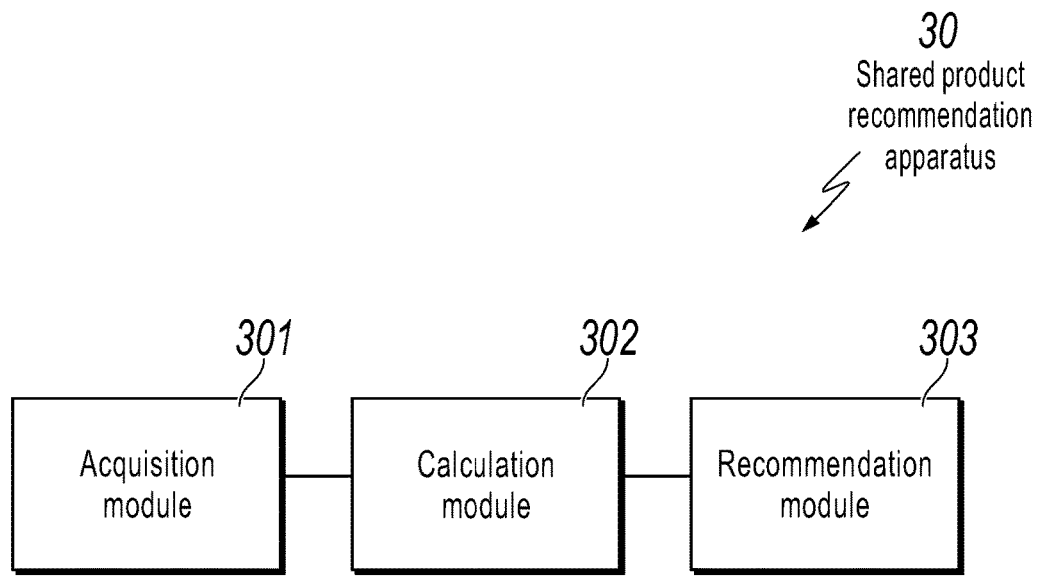
FIG. 3 is a logical block diagram illustrating a shared product recommendation apparatus, according to an implementation of the present specification.

FIG. 3 is a block diagram illustrating a shared product recommendation apparatus, according to an example implementation of the present specification.

Referring to FIG. 3, the shared product recommendation apparatus 30 can be applied to the electronic device shown in FIG. 2. The apparatus 30 includes an acquisition module 301, a calculation module 302, and a recommendation module 303.

The acquisition module 301 is configured to obtain credit information of a user.

The calculation module 302 is configured to input the credit information to a recommendation model for calculation, where the recommendation model is a machine learning model, and model features of the machine learning model include the credit information of the user.

The recommendation module 303 is configured to recommend a shared product to the user based on a calculation result of the recommendation model, where a usage history of the user for the shared product is used to evaluate the credit information of the user.

In the present implementation, the model features further include basic information about the shared product, and the basic information about the shared product includes a credit admission condition of the shared product; and the calculation module 302 is further configured to: input the basic information about the shared product to the recommendation model for calculation.

In the present implementation, the model features further include condition of use information of the shared product and user information used to determine whether the user satisfies a condition of use of the shared product.

In the present implementation, the calculation result of the recommendation model is a use probability of the user for the shared product; and the recommendation module 303 is configured to: determine whether the use probability of the user for the shared product calculated by the recommendation model reaches a predetermined threshold; and recommend the shared product to the user if the use probability of the user for the shared product reaches the predetermined threshold.

In the present implementation, the recommendation module 303 is further configured to: determine whether the user satisfies a condition of use of the shared product before recommending the shared product to the user; and recommend the shared product to the user if the user satisfies the condition of use of the shared product.

In the present implementation, the condition of use includes at least one of the following conditions: a distance between the user and the shared product is less than a predetermined threshold; the user matches a user group predetermined for the shared product; a use environment of the user matches a use environment predetermined for the shared product; or a proportion of a negative usage history in the usage history of the user for the shared product is less than a predetermined threshold.

In the present implementation, the credit information of the user is a credit score obtained after the user is evaluated based on a credit evaluation model.

For an implementation process of functions of the modules in the apparatus, references can be made to the implementation process of the corresponding steps in the method. Details are omitted here for simplicity.

The apparatus implementation basically corresponds to the method implementation. Therefore, for related parts, references can be made to partial description in the method implementation. The described apparatus implementation is merely an example. The units described as separate parts may or may not be physically separate, and parts displayed as units may or may not be physical units, may be located in one place, or may be distributed on a plurality of network units. Some or all of these modules can be selected based on actual demands to achieve the objectives of the technical solutions of the present specification. A person of ordinary skill in the art can understand and implement the technical solutions of the present specification without creative efforts.

The system, apparatus, module, or unit illustrated in the previously described implementations can be implemented by a computer chip or an entity, or can be implemented by a product having a certain function. A typical implementation device is a computer. Specific forms of the computer can be a personal computer, a laptop computer, a cellular phone, a camera phone, a smartphone, a personal digital assistant, a media player, a navigation device, an email transceiver, a game console, a tablet computer, a wearable device, or any combination of several of these devices.

Corresponding to the previously described method implementation, the present specification further provides an implementation of an electronic device. The electronic device includes a processor and a memory, configured to store a machine executable instruction. The processor and the memory are usually connected to each other by using an internal bus. In another possible implementation, the device can further include an external interface, to communicate with another device or component.

In the present implementation, by reading and executing the machine executable instruction that is stored in the memory and corresponds to control logic of shared product recommendation, the processor is prompted to perform the following steps: obtaining credit information of a user; inputting the credit information to a recommendation model for calculation, where the recommendation model is a machine learning model, and model features of the machine learning model include the credit information of the user; and recommending a shared product to the user based on a calculation result of the recommendation model, where a usage history of the user for the shared product is used to evaluate the credit information of the user.

In the present implementation, the model features further include basic information about the shared product, and the basic information about the shared product includes a credit admission condition of the shared product; and by reading and executing the machine executable instruction that is stored in the memory and corresponds to the control logic of the shared product recommendation, the processor is further prompted to perform the following steps: inputting the basic information about the shared product to the recommendation model for calculation.

In the present implementation, the calculation result of the recommendation model is a use probability of the user for the shared product; and by reading and executing the machine executable instruction that is stored in the memory and corresponds to the control logic of the shared product recommendation, the processor is further prompted to perform the following steps: determining whether the use probability of the user for the shared product calculated by the recommendation model reaches a predetermined threshold, and recommend the shared product to the user if the use probability of the user for the shared product reaches the predetermined threshold.

In the present implementation, by reading and executing the machine executable instruction that is stored in the memory and corresponds to the control logic of the shared product recommendation, the processor is further prompted to perform the following steps: determining whether the user satisfies a condition of use of the shared product before recommending the shared product to the user, and recommending the shared product to the user if the user satisfies the condition of use of the shared product.

The specific implementations of the present specification are described above. Other implementations are within the scope of the appended claims. In some cases, the actions or steps described in the claims can be performed in a sequence different from that in the implementations, and the desired results can still be achieved. In addition, the process described in the accompanying drawings does not necessarily require a particular sequence or sequential sequence shown to achieve the desired results. In some implementations, multi-task processing and parallel processing are also possible or can be advantageous.

The implementations of the present specification are described in a progressive way. For same or similar parts in the implementations, references can be made to these implementations, and each implementation focuses on a difference from other implementations. In particular, implementations of the apparatus, the system, the electronic device, and the nonvolatile computer storage medium are basically similar to the method implementation, and therefore are described briefly. For related parts, references can be made to partial description in the method implementation.

It can be seen from the previous description of the implementations that a person skilled in the art can clearly understand that the implementations of the present specification can be implemented by software in addition to a necessary universal hardware platform. Based on such an understanding, the technical solutions of the implementations of the present specification, essentially or the part contributing to the existing technology, can be embodied in a form of a software product. The software program product can be stored in a storage medium such as a ROM/RAM, a hard disk, or a compact disc, and includes several instructions for instructing a computer device (which can be a personal computer, a server, or a network device) to execute the methods described in the implementations or some of the implementations of the present specification.

The system, apparatus, module, or unit illustrated in the previously described implementations can be implemented by a computer chip or an entity, or can be implemented by a product having a certain function. A typical implementation device is a computer. Specific forms of the computer can be a personal computer, a laptop computer, a cellular phone, a camera phone, a smartphone, a personal digital assistant, a media player, a navigation device, an email transceiver, a game console, a tablet computer, a wearable device, or any combination of several of these devices.

The implementations of the present specification are described in a progressive way. For same or similar parts in the implementations, references can be made to these implementations, and each implementation focuses on a difference from other implementations. In particular, the apparatus implementation is basically similar to the method implementation, and therefore is described briefly. For related parts, references can be made to partial description in the method implementation. The described apparatus implementation is merely an example. The modules described as separate parts may or may not be physically separate. The functions of the modules can be implemented in same or different software or hardware when implementing the solutions of the implementations of the present specification. Some or all of the modules can be selected based on actual demands to achieve the objectives of the implementations. A person of ordinary skill in the art can understand and implement the technical solutions of the present specification without creative efforts.

The previous descriptions are merely specific implementations of the implementations of the present specification. It is worthwhile to note that a person of ordinary skill in the art can make some improvements and modifications without departing from the principle of the implementations of the present specification. These improvements and modifications shall also fall within the protection scope of the implementations of the present specification.

What is claimed is:

1. A computer-implemented method for shared product recommendation, wherein the method comprises:
    obtaining, by an electronic device, credit information of a user, wherein the credit information of the user is derived at least in part from a usage history of the user for a first shared product, wherein the usage history of the user comprises a history of whether the user has returned the first shared product on time or whether the user has damaged the first shared product;
    inputting, by the electronic device, the credit information of the user to a recommendation model for calculation, wherein the recommendation model is a machine learning model, wherein the recommendation model is trained based on credit information of a plurality of sample users, wherein the credit information of the plurality of sample users is derived from usage history of the plurality of sample users for one or more shared products;
    deriving, by the electronic device and based on the recommendation model, a shared product use probability; and
    recommending, by the electronic device, a second shared product to the user based on the shared product use probability.

2. The method according to claim 1, wherein the method comprises:
    inputting basic information about the second shared product to the recommendation model for calculation, wherein the basic information about the second shared product comprises a credit admission condition of the second shared product.

3. The method according to claim 1, wherein the method comprises:
    inputting information about a precondition for use of the second shared product to the recommendation model for calculation; and
    inputting user information to the recommendation model for calculation, wherein the user information is used to determine whether a user satisfies the precondition for use of the second shared product.

4. The method according to claim 3, wherein recommending the second shared product to the user comprises:
    determining that the shared product use probability satisfies a predetermined threshold; and
    recommending the second shared product to the user in responsive to determining that the shared product use probability satisfies the predetermined threshold.

5. The method according to claim 4, wherein, before recommending the second shared product to the user, the method comprises:
    determining that the user satisfies the precondition for use of the second shared product.

6. The method according to claim 3, wherein the precondition for use comprises at least one of the following conditions:
    a distance between the user and the second shared product is less than a predetermined threshold;

the user corresponds to a user group predetermined for the second shared product;

a use environment of the user matches a use environment predetermined for the second shared product; and a proportion of a negative usage history in the usage history of the user for the second shared product is less than a predetermined threshold.

7. The method according to claim 1, wherein the credit information of the user is a credit score obtained by inputting the usage history of the user into a credit evaluation model.

8. A non-transitory, computer-readable medium storing one or more instructions executable by a computer system to perform operations comprising:

obtaining, by an electronic device, credit information of a user, wherein the credit information of the user is derived at least in part from a usage history of the user for a first shared product, wherein the usage history of the user comprises a history of whether the user has returned the first shared product on time or whether the user has damaged the first shared product;

inputting, by the electronic device, the credit information of the user to a recommendation model for calculation, wherein the recommendation model is a machine learning model, wherein the recommendation model is trained based on credit information of a plurality of sample users, wherein the credit information of the plurality of sample users is derived from usage history of the plurality of sample users for one or more shared products;

deriving, by the electronic device and based on the recommendation model, a shared product use probability; and recommending, by the electronic device, a second shared product to the user based on the shared product use probability.

9. The non-transitory, computer-readable medium according to claim 8, wherein the operations comprise:

inputting basic information about the second shared product to the recommendation model for calculation, wherein the basic information about the second shared product comprises a credit admission condition of the second shared product.

10. The non-transitory, computer-readable medium according to claim 8, wherein the operations comprise:

inputting information about a precondition for use of the second shared product to the recommendation model for calculation; and inputting user information to the recommendation model for calculation, wherein the user information is used to determine whether a user satisfies the precondition for use of the second shared product.

11. The non-transitory, computer-readable medium according to claim 10, wherein recommending the second shared product to the user comprises:

determining that the shared product use probability satisfies a predetermined threshold; and recommending the second shared product to the user in responsive to determining that the shared product use probability satisfies the predetermined threshold.

12. The non-transitory, computer-readable medium according to claim 11, wherein, before recommending the second shared product to the user, the operations comprise:

determining that the user satisfies the precondition for use of the second shared product.

13. The non-transitory, computer-readable medium according to claim 10, wherein the precondition for use comprises at least one of the following conditions:

a distance between the user and the second shared product is less than a predetermined threshold;

the user corresponds to a user group predetermined for the second shared product;

a use environment of the user matches a use environment predetermined for the second shared product; and a proportion of a negative usage history in the usage history of the user for the second shared product is less than a predetermined threshold.

14. The non-transitory, computer-readable medium according to claim 8, wherein the credit information of the user is a credit score obtained by inputting the usage history of the user into a credit evaluation model.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining, by an electronic device, credit information of a user, wherein the credit information of the user is derived at least in part from a usage history of the user for a first shared product, wherein the usage history of the user comprises a history of whether the user has returned the first shared product on time or whether the user has damaged the first shared product;

inputting, by the electronic device, the credit information of the user to a recommendation model for calculation, wherein the recommendation model is a machine learning model, wherein the recommendation model is trained based on credit information of a plurality of sample users, wherein the credit information of the plurality of sample users is derived from usage history of the plurality of sample users for one or more shared products;

deriving, by the electronic device and based on the recommendation model, a shared product use probability; and recommending, by the electronic device, a second shared product to the user based on the shared product use probability.

16. The computer-implemented system according to claim 15, wherein the operations comprise:

inputting basic information about the second shared product to the recommendation model for calculation, wherein the basic information about the second shared product comprises a credit admission condition of the second shared product.

17. The computer-implemented system according to claim 15, wherein the operations comprise:

inputting information about a precondition for use of the second shared product to the recommendation model for calculation; and inputting user information to the recommendation model for calculation, wherein the user information is used to determine whether a user satisfies the precondition for use of the second shared product.

18. The computer-implemented system according to claim 17, wherein recommending the second shared product to the user comprises:

determining that the shared product use probability satisfies a predetermined threshold; and recommending the second shared product to the user in responsive to determining that the shared product use probability satisfies the predetermined threshold.

19. The computer-implemented system according to claim 18, wherein, before recommending the second shared product to the user, the operations comprise:

determining that the user satisfies the precondition for use of the second shared product.

20. The computer-implemented system according to claim 17, wherein the precondition for use comprises at least one of the following conditions:

a distance between the user and the second shared product is less than a predetermined threshold;

the user corresponds to a user group predetermined for the second shared product;

a use environment of the user matches a use environment predetermined for the second shared product; and a proportion of a negative usage history in the usage history of the user for the second shared product is less than a predetermined threshold.

\* \* \* \* \*

UNITED STATES PATENT AND TRADEMARK OFFICE
CERTIFICATE OF CORRECTION

PATENT NO. : 10,956,976 B2  
APPLICATION NO. : 16/806919  
DATED : March 23, 2021  
INVENTOR(S) : Qianyuan Li Page 1 of 1

It is certified that error appears in the above-identified patent and that said Letters Patent is hereby corrected as shown below:

On the Title Page

Column 2, Item (56) Other Publications, Line 3, delete "Multimedi" and insert -- Multimedia --, therefor.

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*